United States Patent
Zhang et al.

(10) Patent No.: US 11,125,156 B2
(45) Date of Patent: Sep. 21, 2021

(54) MOBILE POWER GENERATION SYSTEM

(71) Applicant: YANTAI JEREH PETROLEUM EQUIPMENT & TECHNOLOGIES CO., LTD., Yantai (CN)

(72) Inventors: Tao Zhang, Yantai (CN); Ning Feng, Yantai (CN); Xin Li, Yantai (CN); Ting Zhang, Yantai (CN); Libin Zhou, Yantai (CN); Lili Wang, Yantai (CN); Wanchun Zha, Yantai (CN)

(73) Assignee: Yantai Jereh Petroleum Equipment & Technologies Co., Ltd., Shandong (CN)

( * ) Notice: Subject to any disclaimer, the term of this patent is extended or adjusted under 35 U.S.C. 154(b) by 0 days.

(21) Appl. No.: 16/837,107

(22) Filed: Apr. 1, 2020

(65) Prior Publication Data
US 2020/0408147 A1 Dec. 31, 2020

(30) Foreign Application Priority Data
Jun. 25, 2019 (CN) .......................... 201910552752.1

(51) Int. Cl.
*F02C 6/00* (2006.01)
*H02K 7/18* (2006.01)

(52) U.S. Cl.
CPC .............. *F02C 6/00* (2013.01); *H02K 7/1823* (2013.01); *F05D 2220/76* (2013.01)

(58) Field of Classification Search
CPC ...... F02C 6/00; H02K 7/1823; F05D 2220/76
USPC ................... 290/1 A, 1 B, 1 R, 2, 52; 123/2; 166/305.1; 60/797
See application file for complete search history.

(56) References Cited

U.S. PATENT DOCUMENTS

| | | | | | |
|---|---|---|---|---|---|
| 2,937,879 | A | * | 5/1960 | Lion | B65D 90/18 280/43.21 |
| 3,289,868 | A | * | 12/1966 | Miller | B66F 7/20 254/45 |
| 3,453,443 | A | * | 7/1969 | Stoeckly | F02C 6/02 290/2 |
| 3,536,928 | A | * | 10/1970 | Jones, Jr. | F02B 63/04 290/1 B |

(Continued)

FOREIGN PATENT DOCUMENTS

| CN | 107208557 A | 9/2017 |
|---|---|---|
| CN | 210289933 U | 4/2020 |

*Primary Examiner* — Pedro J Cuevas
(74) *Attorney, Agent, or Firm* — Volpe Koenig (57) ABSTRACT

The present invention discloses a mobile power generation system. The whole power generation system is assigned onto two conveyances. A gas turbine, a generator, an intake chamber, an exhaust collector, and an auxiliary system are disposed on a first conveyance, an intake assembly and an exhaust duct are integrally disposed on a second conveyance. The second conveyance further includes at least four lifting gears, which are configured to separate the intake assembly and the exhaust duct from the second conveyance, and jack up the intake assembly and the exhaust duct so as to accommodate the power generation transport apparatus and move it to the bottom of the intake assembly and the exhaust duct. The intake assembly and the exhaust duct are then brought down by the lifting gears to dock with the intake chamber and the exhaust collector respectively. A seal docking can be achieved by the weights of the intake assembly and the exhaust duct themselves.

11 Claims, 5 Drawing Sheets

(56) References Cited

U.S. PATENT DOCUMENTS

| | | | | | |
|---|---|---|---|---|---|
| 3,541,598 | A * | 11/1970 | Dousset | | B60P 1/6409 414/459 |
| 3,567,271 | A * | 3/1971 | Gostomski | | B60P 1/6427 296/164 |
| 3,570,695 | A * | 3/1971 | Schwartz | | B66C 19/007 414/460 |
| 3,640,502 | A * | 2/1972 | Bargman, Jr. | | B60P 3/36 254/45 |
| 3,688,931 | A * | 9/1972 | Hans Tax | | B66C 19/007 414/460 |
| 3,744,652 | A * | 7/1973 | Rieschel | | B66C 19/007 414/459 |
| 3,791,682 | A * | 2/1974 | Mitchell | | F01D 15/10 290/2 |
| 3,881,689 | A * | 5/1975 | Bury | | B60P 3/32 254/45 |
| 3,925,679 | A * | 12/1975 | Berman | | E04B 1/3483 290/1 R |
| 3,995,760 | A * | 12/1976 | Burgdorf | | B60P 1/6418 414/498 |
| 4,117,342 | A * | 9/1978 | Melley, Jr. | | B60P 3/00 290/1 A |
| 4,136,432 | A * | 1/1979 | Melley, Jr. | | B60P 3/00 29/469 |
| 4,171,927 | A * | 10/1979 | Aoyama | | B60P 1/38 414/460 |
| 4,491,452 | A * | 1/1985 | Matovich | | B60B 29/002 254/4 R |
| 4,599,030 | A * | 7/1986 | Skaalen | | B62D 7/1509 180/236 |
| 4,723,744 | A * | 2/1988 | Baker, Jr. | | B60P 3/32 248/165 |
| 4,992,669 | A * | 2/1991 | Parmley | | F01B 1/12 123/2 |
| 5,417,540 | A * | 5/1995 | Cox | | B60P 1/6427 414/495 |
| 5,517,822 | A * | 5/1996 | Haws | | F01K 17/025 60/618 |
| 5,624,225 | A * | 4/1997 | Cox | | B60P 1/6427 414/495 |
| 5,800,114 | A * | 9/1998 | Secondi | | B66F 3/46 280/43.23 |
| D456,583 | S * | 4/2002 | Schmidt | | D34/28 |
| 6,388,869 | B1 * | 5/2002 | Fauteux | | H02B 1/52 307/150 |
| 6,393,775 | B1 * | 5/2002 | Staschik | | C02F 9/00 210/170.08 |
| 6,449,957 | B1 * | 9/2002 | Takamatsu | | F01D 25/28 60/796 |
| 6,450,133 | B1 * | 9/2002 | Bernard | | F01P 5/04 123/2 |
| 6,601,542 | B2 * | 8/2003 | Campion | | F02B 63/04 123/2 |
| 6,644,247 | B2 * | 11/2003 | Campion | | H02P 9/04 123/2 |
| 6,688,048 | B2 * | 2/2004 | Staschik | | C02F 9/00 52/220.1 |
| 6,749,388 | B1 * | 6/2004 | Schmidt | | B66C 19/007 414/459 |
| 6,765,304 | B2 * | 7/2004 | Baten | | F02B 63/04 290/1 A |
| 6,786,051 | B2 * | 9/2004 | Kristich | | F01D 15/10 60/796 |
| 6,893,487 | B2 * | 5/2005 | Alger | | B01D 46/10 55/385.1 |
| 6,895,903 | B2 * | 5/2005 | Campion | | F02B 63/04 123/2 |
| 7,007,966 | B2 * | 3/2006 | Campion | | B60P 3/00 123/2 |
| 7,081,682 | B2 * | 7/2006 | Campion | | F02B 63/04 123/2 |
| D526,932 | S * | 8/2006 | Bock | | D12/1 |
| 7,100,896 | B1 * | 9/2006 | Cox | | B66F 3/44 254/92 |
| 7,122,913 | B2 * | 10/2006 | Witten | | F02B 63/04 290/1 A |
| 7,221,061 | B2 * | 5/2007 | Alger | | F02B 63/04 290/1 A |
| 7,451,883 | B2 * | 11/2008 | Wierzba | | B66C 13/18 212/316 |
| 7,466,033 | B2 * | 12/2008 | Witten | | F02B 63/04 290/1 A |
| 7,546,929 | B2 * | 6/2009 | Wierzba | | B66C 11/04 212/326 |
| 7,608,934 | B1 * | 10/2009 | Hunter | | F02D 25/00 290/4 R |
| 7,619,319 | B1 * | 11/2009 | Hunter | | B60L 53/18 290/4 R |
| 7,722,110 | B2 * | 5/2010 | McCarthy | | B60P 3/32 296/156 |
| 7,731,041 | B2 * | 6/2010 | Gredel | | B66C 1/104 212/316 |
| 7,811,044 | B2 * | 10/2010 | Warhurst | | B60P 1/6445 414/458 |
| 7,866,933 | B2 * | 1/2011 | Welch | | B60P 1/6445 414/458 |
| 7,913,864 | B2 * | 3/2011 | Wierzba | | B66C 13/18 212/289 |
| 7,921,914 | B2 * | 4/2011 | Bruins | | E21B 43/26 166/177.5 |
| 7,926,671 | B2 * | 4/2011 | Wierzba | | B66C 11/04 212/316 |
| 7,976,266 | B2 * | 7/2011 | Brown | | F02C 7/20 248/157 |
| 8,037,966 | B2 * | 10/2011 | Errera | | F01N 5/04 181/203 |
| 8,182,193 | B2 * | 5/2012 | Gaudet | | B60G 3/145 414/495 |
| 8,221,626 | B2 * | 7/2012 | Sassow | | C02F 3/006 210/603 |
| 8,294,285 | B2 * | 10/2012 | Hunter | | B60L 1/006 290/1 R |
| 8,294,286 | B2 * | 10/2012 | Hunter | | F03G 7/08 290/1 R |
| 8,450,863 | B2 * | 5/2013 | Farr | | H02B 1/00 174/17 R |
| 8,480,158 | B2 * | 7/2013 | McCarthy | | B60P 3/32 296/156 |
| 8,491,009 | B2 * | 7/2013 | Shelton | | B60P 3/36 254/418 |
| 8,495,869 | B2 * | 7/2013 | Beissler | | F01N 13/00 60/274 |
| 8,587,136 | B2 * | 11/2013 | Williams | | F01K 13/00 290/1 A |
| 8,678,471 | B2 * | 3/2014 | McCarthy | | B60S 9/08 296/156 |
| 8,678,941 | B2 * | 3/2014 | Bilsen | | B60P 3/0252 446/427 |
| 8,680,728 | B2 * | 3/2014 | Errera | | F01N 5/04 123/2 |
| 8,789,601 | B2 * | 7/2014 | Broussard | | E21B 43/26 166/177.5 |
| 8,857,837 | B2 * | 10/2014 | Gaudet | | B60G 3/145 280/124.128 |
| 9,103,193 | B2 * | 8/2015 | Coli | | F04B 49/20 |
| 9,174,828 | B2 * | 11/2015 | Stokes | | B66F 3/28 |
| 9,302,891 | B2 * | 4/2016 | Wierzba | | B66C 11/04 |
| 9,376,801 | B1 * | 6/2016 | Warren | | E04H 5/00 |
| 9,470,460 | B2 * | 10/2016 | Stimus | | F02C 7/20 |
| 9,534,370 | B2 * | 1/2017 | Kokoschka | | B65D 88/121 |
| 9,534,473 | B2 * | 1/2017 | Morris | | F01D 25/28 |
| 9,562,420 | B2 * | 2/2017 | Morris | | E21B 41/0085 |
| 9,590,472 | B2 * | 3/2017 | Davies | | H02K 7/1823 |
| 9,791,590 | B2 * | 10/2017 | Morton | | G01V 5/0016 |
| 9,938,777 | B2 * | 4/2018 | Sigmar | | E04H 12/345 |
| 10,030,579 | B2 * | 7/2018 | Austin | | F16M 5/00 |
| 10,184,397 | B2 * | 1/2019 | Austin | | F02C 6/00 |
| 10,266,219 | B2 * | 4/2019 | Van Raden | | B62D 57/032 |

(56) References Cited

U.S. PATENT DOCUMENTS

| | | | |
|---|---|---|---|
| 10,317,566 B2* | 6/2019 | Morton | G01V 5/0016 |
| 10,337,402 B2* | 7/2019 | Austin | F16M 5/00 |
| 10,371,012 B2* | 8/2019 | Davis | F02B 63/047 |
| 10,458,334 B2* | 10/2019 | Davis | F01D 15/10 |
| 10,532,899 B2* | 1/2020 | Oh | B65G 67/02 |
| 10,961,914 B1* | 3/2021 | Yeung | F02C 6/00 |
| 10,962,305 B2* | 3/2021 | Morris | F28F 27/00 |
| 2002/0189173 A1* | 12/2002 | Staschik | F24D 12/02 52/79.1 |
| 2003/0030246 A1* | 2/2003 | Campion | B60P 3/00 280/423.1 |
| 2003/0030279 A1* | 2/2003 | Campion | F02B 63/04 290/1 A |
| 2003/0030281 A1* | 2/2003 | Campion | H02P 9/04 290/1 R |
| 2003/0033994 A1* | 2/2003 | Campion | F02B 63/04 123/41.56 |
| 2003/0057704 A1* | 3/2003 | Baten | F02B 63/04 290/3 |
| 2003/0079479 A1* | 5/2003 | Kristich | F01D 25/28 60/797 |
| 2004/0104577 A1* | 6/2004 | Alger | H02J 7/34 290/1 A |
| 2006/0006652 A1* | 1/2006 | Witten | F02B 63/04 290/1 A |
| 2006/0080971 A1* | 4/2006 | Smith | F01D 21/003 60/797 |
| 2006/0260331 A1* | 11/2006 | Andreychuk | F04B 17/06 62/50.2 |
| 2006/0288902 A1* | 12/2006 | McGuire | B61D 3/184 105/215.2 |
| 2009/0308602 A1* | 12/2009 | Bruins | E21B 43/26 166/250.01 |
| 2009/0322096 A1* | 12/2009 | Errera | F02B 63/04 290/1 A |
| 2010/0060093 A1* | 3/2010 | Hunter | B60L 53/53 310/89 |
| 2011/0057454 A1* | 3/2011 | Kawakita | F02B 63/04 290/1 A |
| 2012/0255734 A1* | 10/2012 | Coli | F04B 19/22 166/305.1 |
| 2013/0026765 A1* | 1/2013 | Errera | F02B 63/04 290/1 A |
| 2014/0039708 A1* | 2/2014 | Curtis | F01K 13/00 700/288 |
| 2014/0174717 A1* | 6/2014 | Broussard | E21B 43/26 166/66.4 |
| 2015/0027712 A1* | 1/2015 | Vicknair | F17D 1/08 166/305.1 |
| 2015/0068754 A1* | 3/2015 | Coli | F04B 47/02 166/308.1 |
| 2015/0122558 A1* | 5/2015 | Van Raden | B62D 57/032 180/8.1 |
| 2015/0252661 A1* | 9/2015 | Glass | E21B 43/267 166/308.1 |
| 2016/0177675 A1* | 6/2016 | Morris | F02C 7/20 166/308.1 |
| 2016/0177678 A1* | 6/2016 | Morris | F01D 25/30 60/772 |
| 2016/0369609 A1 | 12/2016 | Morris | F04B 17/06 |
| 2017/0036716 A1* | 2/2017 | Van Raden | E21B 15/003 |
| 2017/0104389 A1* | 4/2017 | Morris | E21B 41/00 |
| 2017/0133909 A1* | 5/2017 | Morales Ivarez | F02C 7/00 |
| 2018/0080376 A1* | 3/2018 | Austin | F16M 3/00 |
| 2018/0080377 A1* | 3/2018 | Austin | B60D 1/00 |
| 2019/0063262 A1* | 2/2019 | Davis | F01D 15/10 |
| 2019/0063263 A1* | 2/2019 | Davis | H02K 9/04 |
| 2019/0063308 A1* | 2/2019 | Davis | F02B 63/047 |
| 2019/0063309 A1* | 2/2019 | Davis | H02K 7/1823 |
| 2019/0063326 A1* | 2/2019 | Davis | F02C 6/14 |
| 2019/0063341 A1* | 2/2019 | Davis | F01D 15/10 |
| 2019/0067991 A1* | 2/2019 | Davis | H02K 7/1823 |
| 2019/0390910 A1* | 12/2019 | Dokic | F28B 9/02 |
| 2020/0347725 A1* | 11/2020 | Morris | F02C 6/00 |
| 2020/0408071 A1* | 12/2020 | Li | F01D 25/30 |
| 2020/0408144 A1* | 12/2020 | Feng | E21B 43/2607 |
| 2020/0408147 A1* | 12/2020 | Zhang | F01D 25/285 |
| 2020/0408149 A1* | 12/2020 | Li | F02C 7/20 |
| 2021/0071574 A1* | 3/2021 | Feng | F02C 7/12 |
| 2021/0079849 A1* | 3/2021 | Yeung | F01D 25/30 |
| 2021/0102531 A1* | 4/2021 | Bodishbaugh | F04B 17/06 |

\* cited by examiner

MOBILE POWER GENERATION SYSTEM

TECHNICAL FIELD

The present invention relates to the field of power generation technologies, and specifically to a mobile power generation system.

BACKGROUND

The oil and gas industry generally adopts hydraulic fracturing to promote the production of hydrocarbon wells (for example, oil or gas wells). Conventional fracturing equipment generally has the problems of occupying a large area, causing severe environmental pollution and so on, failing to satisfy the increasingly serious environmental requirements and the requirements on the area occupied by well-site operations.

A complete set of electrically-driven fracturing equipment will effectively reduce the discharge of environmental pollutants, the occupied area, noise and the operation and maintenance costs. With the use of a complete set of electrically-driven fracturing equipment and the continuous increase of the power of electrically-driven fracturing equipment, higher requirements are imposed on power supply at the operation site. At the well-site, the power supply for fracturing equipment generally cannot be realized by using a power grid. Moreover, the fracturing operation has the characteristic of short operation cycle, and fracturing equipment needs to be moved among different well-sites. Generally, because various parts of a power supply system require different assembly, transportation and installation methods, the installation time of the power supply system will be up to half to one month.

Therefore, how to provide a mobile power supply system which can be quickly and conveniently installed at the electrically-driven fracturing operation site is currently a great challenge for electrically-driven fracturing operations.

SUMMARY

To overcome the deficiencies in the prior art, an objective of the present invention is to provide a mobile power generation system, the whole power generation system is assigned onto two conveyances. A gas turbine, a generator, an intake chamber, an exhaust collector, and an auxiliary system are disposed on a first conveyance, an intake assembly and an exhaust duct are integrally disposed on a second conveyance. The second conveyance further includes at least four lifting gears, which are configured to separate the intake assembly and the exhaust duct from the second conveyance, and jack up the intake assembly and the exhaust duct so as to accommodate the power generation transport apparatus and move it to the bottom of the intake assembly and the exhaust duct. The intake assembly and the exhaust duct are then brought down by the lifting gears to dock with the intake chamber and the exhaust collector respectively. A seal docking can be achieved by the weights of the intake assembly and the exhaust duct themselves. For the overall technical solution, the design is simple (the whole power generation system is only assigned onto two conveyances, occupying a small area, with less transportation energy consumption, and a compact structure), the installation is quick and convenient (it is only need to separate and jack up the intake-exhaust system in the intake-exhaust transport apparatus, and then move the power generation transport apparatus to the bottom of the intake-exhaust system, so as to implement the installation and docking of the power generation system).

The objective of the present invention is achieved by the following technical measures: a mobile power generation system, including a power generation transport apparatus and an intake-exhaust transport apparatus, the power generation transport apparatus includes a gas turbine, a generator, an intake chamber, an exhaust collector, an auxiliary system and a first conveyance, the auxiliary system is applied to the gas turbine and the generator; the intake-exhaust transport apparatus includes an intake-exhaust system and a second conveyance, the intake-exhaust system and the second conveyance are separably connected, the intake-exhaust system includes an intake assembly and an exhaust duct, and the intake assembly and the exhaust duct are integrally transferred and connected to the top of the power generation transport apparatus.

Further, the intake assembly and the exhaust duct are transferred and jacked up as a whole by at least four lifting gears.

Further, the lifting gears include supporting legs, a horizontal hydraulic cylinder and a vertical hydraulic cylinder, the horizontal hydraulic cylinder is configured to implement the horizontal movement of the supporting legs, and the vertical hydraulic cylinder is configured to implement the vertical expansion of the supporting legs.

Further, the supporting legs can move outward the second conveyance, and can jack up the intake assembly and the exhaust duct, the jack-up height of the supporting legs is greater than the height of the power generation transport apparatus.

Further, the power generation transport apparatus further includes an electric power unit and a control system, the electric power unit is configured to output electric power from the generator, and the control system includes a gas turbine control unit and a generator control unit.

Further, the exhaust duct includes an exhaust stack and an exhaust silencer, during transportation, the exhaust stack is sleeved outside the exhaust silencer, while in working state, the exhaust stack is disposed on the top of the exhaust silencer.

Compared with the prior art, the present invention has the following beneficial effects: For the overall technical solution, the design is simple (the whole power generation system is only assigned onto two conveyances, occupying a small area, with less transportation energy consumption, and a compact structure), the installation is quick and convenient (it is only need to separate and jack up the intake-exhaust system in the intake-exhaust transport apparatus, and then move the power generation transport apparatus to the bottom of the intake-exhaust system, so as to implement the installation and docking of the power generation system). The docking port is sealed by the equipment's own weight, with the sealing convenient and reliable. After installation and docking, the power generation system in working state is top mounted, thus greatly reducing the occupied area of the whole power generation system.

The present invention will be described in detail below with reference to the accompanying drawings and specific implementations.

Wherein, 100. power generation transport apparatus, 101. turbine housing, 102. intake chamber, 103. exhaust collector, 104. ventilation intake, 105. gas turbine, 106. generator, 107. electric power unit, 108. control system, 109. first conveyance, 200. intake-exhaust transport apparatus, 201. intake assembly, 202. exhaust duct, 203. lifting gear, 204. second conveyance, 205. supporting leg, 301. vertical hydraulic cylinder, 302. horizontal hydraulic cylinder, and 303. expansion support.

DESCRIPTION OF THE EMBODIMENTS

As used herein, the term "conveyance" refers to any transportation unit, including a trailer, a truck, a skid or a barge used for large tonnage gravity transportation.

As used herein, the term "intake chamber" can be replaced throughout the disclosure, and is called "inlet", "air intake port" and "intake chamber" in general. In addition, the term "exhaust collector" can be replaced throughout the disclosure, and is called "exhaust diffuser" and "exhaust chamber" in general.

A mobile power generation system, including a power generation transport apparatus 100 and an intake-exhaust transport apparatus 200, the power generation transport apparatus 100 includes a gas turbine 105, a generator 106, an intake chamber 102, an exhaust collector 103, an auxiliary system and a first conveyance 109; the auxiliary system is applied to the gas turbine 105 and the generator 106, the auxiliary system includes a turbine lubrication system, a fire fighting system and a generator lubrication system and the like. The intake-exhaust transport apparatus 200 includes an intake-exhaust system and a second conveyance 204, the intake-exhaust system and the second conveyance 204 are separably connected, the intake-exhaust system includes an intake assembly 201 and an exhaust duct 202, the intake assembly 201 and the exhaust duct 202 are integrally transferred and connected to the top of the power generation transport apparatus 100. The intake assembly 201 and the exhaust duct 202 are disposed on a conveyance in combination, improving the ease of transportation.

Plentiful and inexpensive hydrocarbon fuels (for example, natural gas) at the oil and gas well-site are used as fuels for the gas turbine 105, which transforms chemical energy of hydrocarbon fuels to mechanical energy. Then the generator 106 transforms the mechanical energy into electric energy, thus achieving an efficient, stable, and mobile supply of electric energy to the electrically-driven fracturing operation site. The intake-exhaust system is transferred and jacked up as a whole by at least four lifting gears 203. The mobile power generation system can implement the quick and convenient installation and docking of a complete set of the power generation system depending on its own lifting gears 203, without the need of additional auxiliary equipment (such as crane, lifter, etc.), thus effectively reducing the time of installation. The four lifting gears 203 are disposed on the four corners of the intake-exhaust system.

Figure 8:
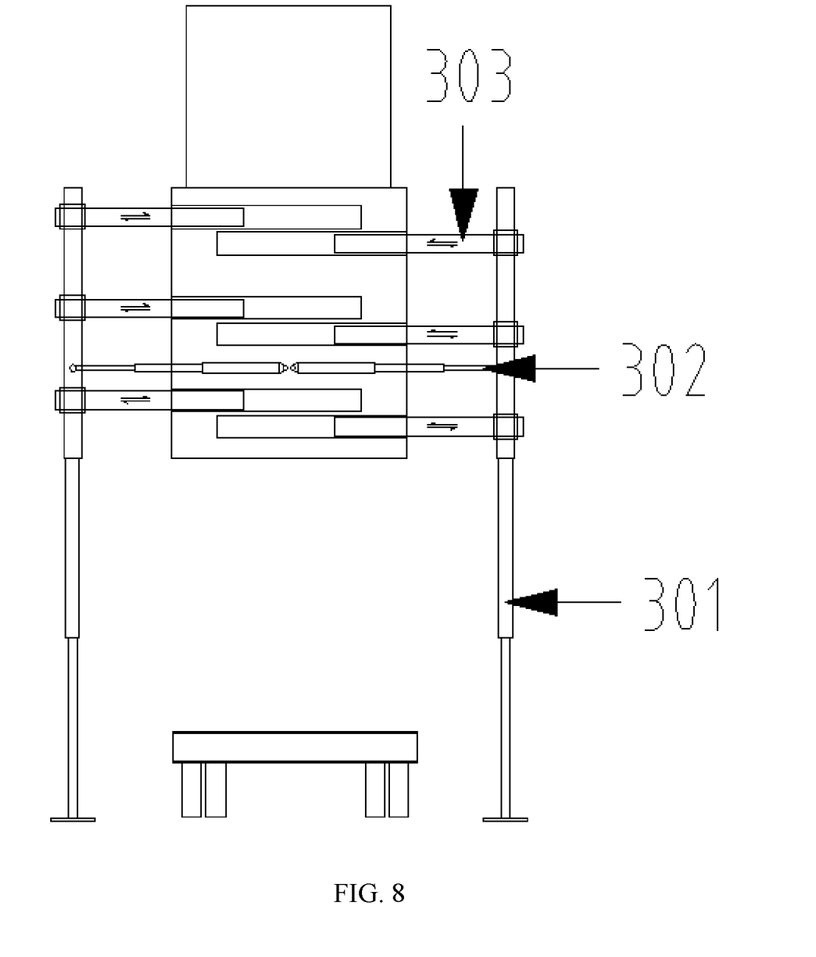
FIG. 8 is a structural schematic diagram of the lifting gears.

The lifting gears 203 include supporting legs 205 and retractable support mechanisms. The supporting legs 205 are composed of vertical hydraulic cylinders 301. The extension of the vertical hydraulic cylinders 301 bring about the jacking up of the intake-exhaust system. The retractable support mechanisms are used to support the intake-exhaust system, and push the vertical hydraulic cylinders 301 outwards through their own horizontal expansion, i.e, to implement the horizontal movement of the supporting legs 205. When docking, the retractable support mechanisms can retract to one side at the same time to adjust the intake-exhaust system to move to the left or the right.

The supporting legs 205 can move outward the second conveyance 204, and can jack up the intake assembly 201 and the exhaust duct 202, the jack-up height of the supporting legs 205 is greater than the height of the power generation transport apparatus 100.

Figure 2:
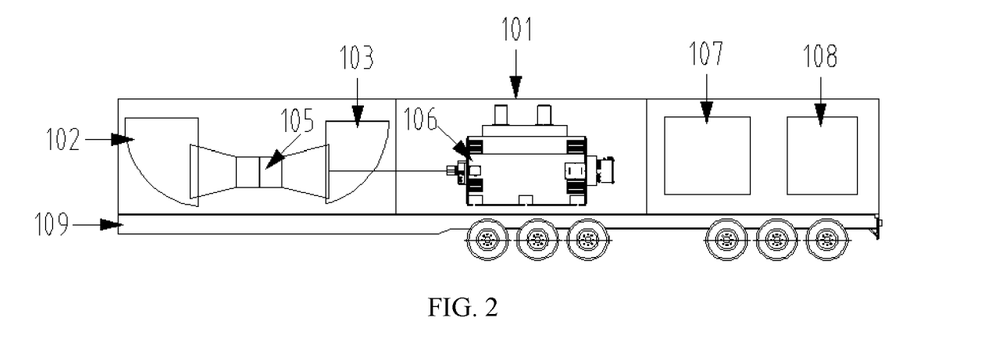
FIG. 2 is a schematic diagram of the internal structure of the power generation transport apparatus.

The power generation transport apparatus 100 further includes an electric power unit 107 and a control system 108, the electric power unit 107 is configured to output electric power from the generator 106, and the control system 108 includes a gas turbine control unit and a generator control unit.

Figure 1:
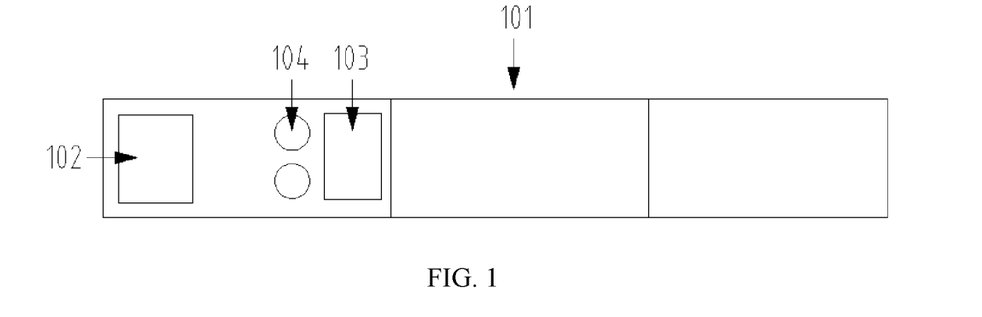
FIG. 1 is a top view of the external structure of the power generation transport apparatus.

FIG. 1 is a top view of the external structure of the power generation transport apparatus. As shown in FIG. 1, the power generation transport apparatus 100 has a turbine housing 101. The shown turbine housing 101 is provided with a ventilation intake 104, a port of an intake chamber 102, and a port of an exhaust collector 103.

FIG. 2 is a schematic diagram of the internal structure of the power generation transport apparatus. As shown in FIG. 2, the power generation transport apparatus 100 is provided with an intake chamber 102, a gas turbine 105, an exhaust collector 103, a generator 106, an electric power unit 107 and a control system 108 inside the turbine housing 101; the gas turbine 105 is connected to the generator 106, the electric power unit 107 and the control system 108 are connected to the intake chamber 102 and the exhaust collector 103 on the gas turbine 105. The exhaust duct 202 in the intake-exhaust system is docked with the port of the exhaust collector 103, and the intake assembly 201 in the intake-exhaust system is docked with the port of the intake chamber 102.

Figure 3:
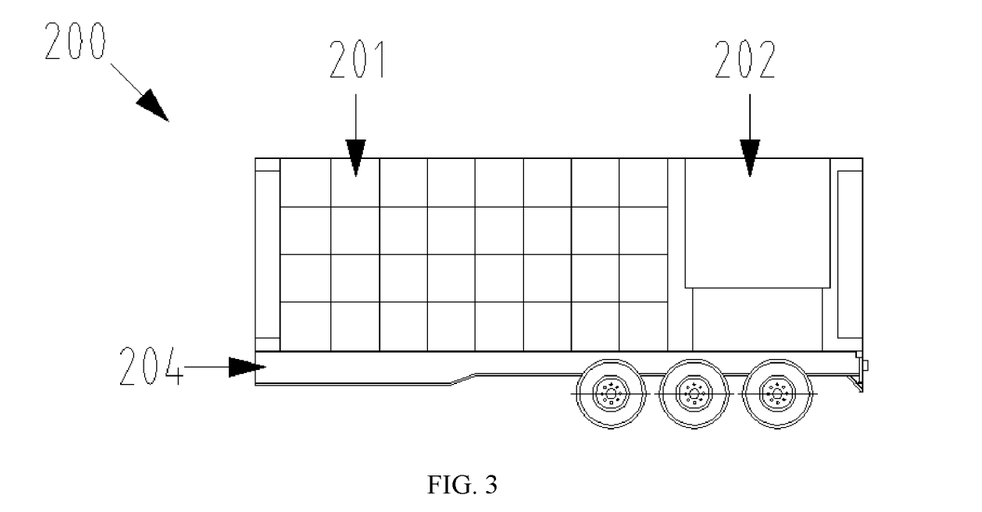
FIG. 3 is a schematic diagram of the intake-exhaust transport apparatus in transport state.

FIG. 3 is a schematic diagram of the intake-exhaust transport apparatus in transport state. As shown in FIG. 3, the second conveyance 204 is provided with an intake assembly 201 and an exhaust duct 202 concurrently. The intake assembly 201 is configured to provide combustion air and gas-turbine-chamber ventilation air. The intake assembly 201 includes an intake filter, an intake silencer and a ventilation fan, the ventilation fan is connected to the ventilation intake 104 on the turbine housing 101. The exhaust duct 202 includes an exhaust silencer and an exhaust stack. During transportation, the exhaust stack is sleeved outside the exhaust silencer, i.e, the exhaust stack dose not occupy vertical height space, the height of the whole intake-exhaust transport apparatus 200 meets the requirements of road transportation.

Figure 4:
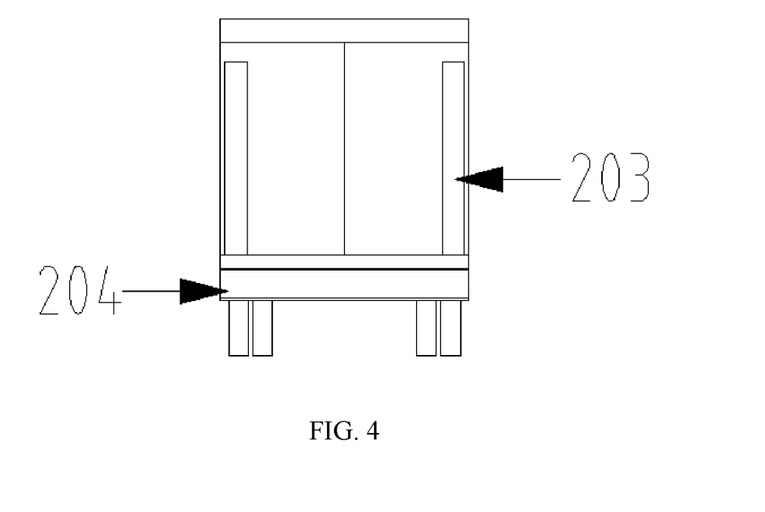
FIG. 4 is a side view of the intake-exhaust transport apparatus in transport state.

FIG. 4 is a side view of the intake-exhaust transport apparatus in transport state. As shown in FIG. 4, the lifting gears 203 are unexpanded at that time, i.e, the supporting legs 205 neither move outward the second conveyance 204, nor jack up the intake-exhaust system upwards. The second conveyance 204 bears the total weight of the lifting gears 203, the intake assembly 201 and the exhaust duct 202.

Figure 5:
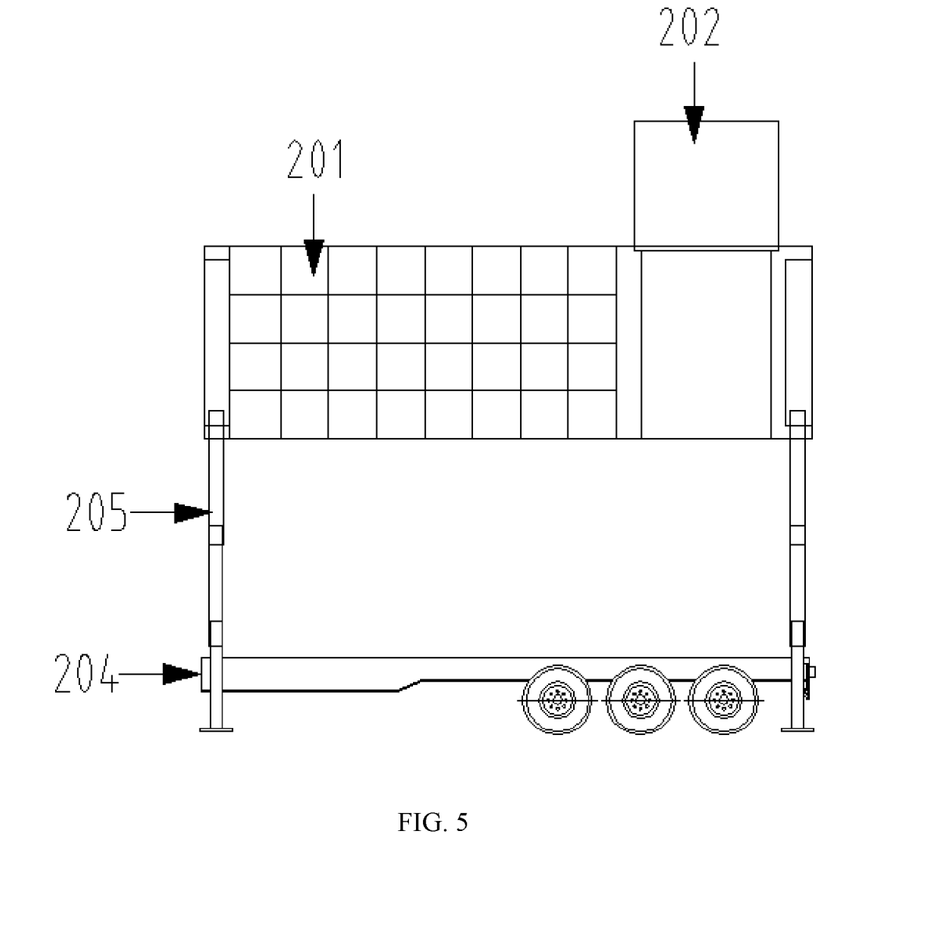
FIG. 5 is a schematic diagram of the intake-exhaust transport apparatus in separation and docking state.

FIG. 5 is a schematic diagram of the intake-exhaust transport apparatus in separation and docking state. As shown in FIG. 5, the lifting gears 203 have expanded at that time, the supporting legs 205 move outward the second conveyance 204, and jack up the intake-exhaust system upwards, so that the second conveyance 204 is separated from the intake-exhaust system completely. The exhaust stack moves upwards through a lifting mechanism, and is disposed on the top of the exhaust silencer. Due to that the exhaust duct 202 and the intake assembly 201 are disposed on the same conveyance closely, to avoid the exhaust from being sucked into the intake assembly 201 after discharge, it is necessary to elevate the distance between the exhaust stack and the intake assembly 201. The lifting mechanism includes, but not limited to, a hydraulic cylinder.

Figure 6:
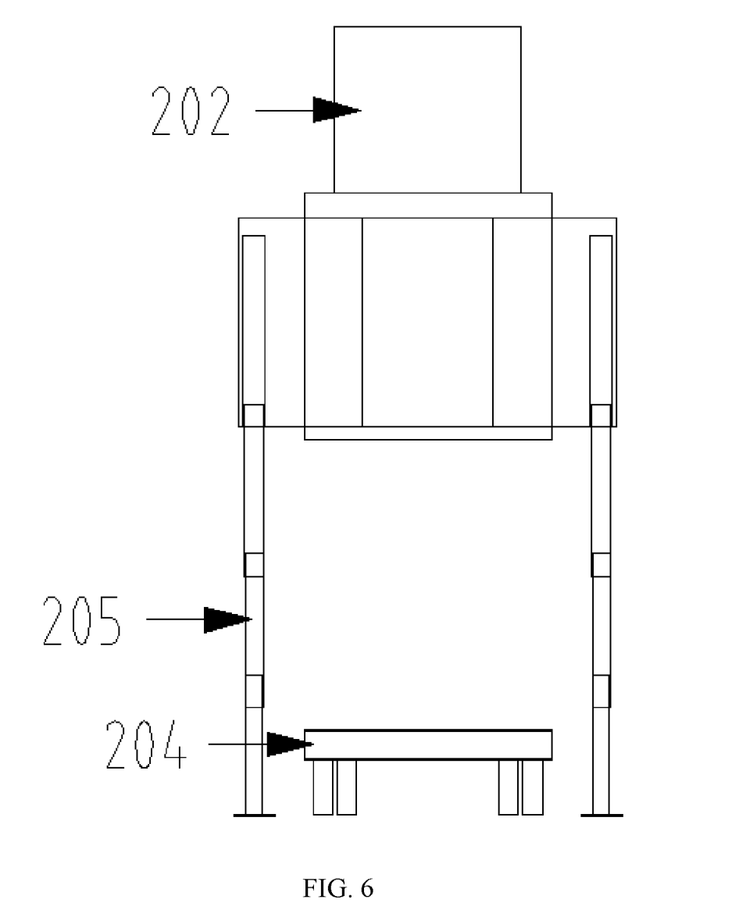
FIG. 6 is a side view of the intake-exhaust transport apparatus in separation and docking state.

FIG. 6 is a side view of the intake-exhaust transport apparatus in separation and docking state. As shown in FIG. 6, the intake-exhaust system has been separated from the second conveyance 204 completely by the lifting gears 203.

Figure 7:
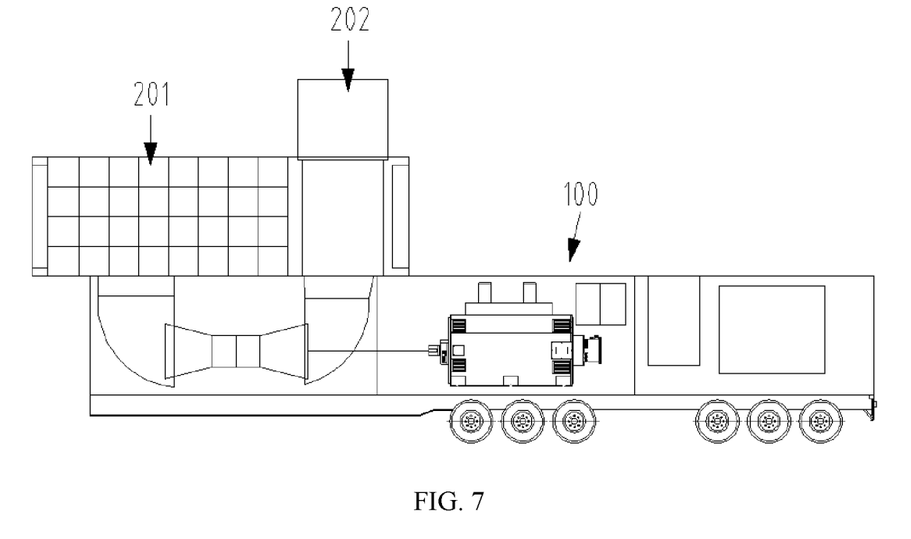
FIG. 7 is a structural schematic diagram of the mobile power generation system.

FIG. 7 is a structural schematic diagram of the mobile power generation system. As shown in FIG. 7, the intake-exhaust system has been mounted on the top of the power generation transport apparatus 100, that is, the working state of the power generation system has been achieved to supply power to electrically-driven fracturing sites.

FIG. 8 is a structural schematic diagram of the lifting gears. As shown in FIG. 8, the retractable support mechanism is configured to bear the intake-exhaust system, the retractable support mechanism includes a supporting frame, an expansion chamber, an expansion support 303 and a horizontal hydraulic cylinder 302, etc. The vertical hydraulic cylinder 301 is connected with the horizontal hydraulic cylinder 302, one end of the expansion support 303 is connected to the vertical hydraulic cylinder 301, and the other end of the expansion support 303 is connected to the expansion chamber, so that the expansion support 303 can stretch in the expansion chamber.

A method of the mobile power generation system, including: moving the intake-exhaust transport apparatus 200 to a designated position at a user site, jacking up the exhaust stack to the top of the exhaust silencer, separating the intake-exhaust system from the second conveyance 204 by using the lifting gears 203, the lifting height is greater than the height of the power generation transport apparatus 100; moving away the second conveyance 204, and moving the power generation transport apparatus 100 to the bottom of the intake-exhaust system; the position of the power generation transport apparatus 100 is adjusted on the travelling direction, the intake-exhaust system is horizontally adjusted through the horizontal hydraulic cylinder 302 so that the port of the intake chamber 102 and the port of the exhaust collector 103 on the power generation transport apparatus 100 correspond to the port of the intake assembly 201 and the port of the exhaust duct 202 respectively; the intake-exhaust system is brought down through the vertical hydraulic cylinder 301 in the lifting gears 203, so that the port of the intake assembly 201 is docked with the port of the intake chamber 102, and the port of the exhaust duct 202 is docked with the port of the exhaust collector 103, i.e, the whole power generation system goes into the working state.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

What is claimed is:

1. A mobile power generation system, comprising:
    a power generation transport apparatus, comprising a first conveyance, a gas turbine, a generator, an intake chamber, and an exhaust collector, the gas turbine, the generator, the intake chamber, and the exhaust collector being disposed on the first conveyance; and
    an intake-exhaust transport apparatus, comprising a second conveyance and an intake-exhaust system, the intake-exhaust system being disposed on the second conveyance,
    wherein the intake-exhaust system comprises an intake assembly and an exhaust duct, the intake assembly and the exhaust duct are configured to be integrally transferred and connected to the top of the power generation transport apparatus,
    the mobile power generation system further comprises at least four lifting gears, disposed at the intake-exhaust system, and configured to jack up the intake-exhaust system to be higher than a height of the power generation transport apparatus, a jack-up height of the at least four lifting gears is greater than the height of the power generation transport apparatus,
    the lifting gears comprise supporting legs and a retractable support mechanism, the supporting legs are configured to jack up the intake-exhaust system by their expansion, and the retractable support mechanism for bearing the intake-exhaust system is configured to implement the horizontal movement of the intake-exhaust system by its horizontal expansion, the retractable support mechanism is configured to retract towards one side at the same time to adjust the intake-exhaust system to move to the left or the right,
    the retractable support mechanism comprises a supporting frame, an expansion support, a horizontal hydraulic cylinder, the horizontal hydraulic cylinder is connected with the supporting legs, one end of the expansion support is connected to one of the supporting legs, and the other end of the expansion support is connected to the expansion chamber.

2. The mobile power generation system according to claim 1, wherein the intake assembly and the exhaust duct are transferred and jacked up as a whole by the at least four lifting gears.

3. The mobile power generation system according to claim 1, wherein the supporting legs can move outward the second conveyance, and can jack up the intake assembly and the exhaust duct, the jack-up height of the supporting legs is greater than the height of the power generation transport apparatus.

4. The mobile power generation system according to claim 1, wherein the power generation transport apparatus further comprises an electric power unit and a control system, the electric power unit is configured to output electric power from the generator, and the control system comprises a gas turbine control unit and a generator control unit.

5. The mobile power generation system according to claim 1, wherein the exhaust duct comprises an exhaust stack and an exhaust silencer, during transportation, the exhaust stack is sleeved outside the exhaust silencer, while in working state, the exhaust stack moves upwards to the top of the exhaust silencer through a lifting mechanism.

6. The mobile power generation system according to claim 1, wherein the at least four lifting gears are configured to jack up the intake-exhaust system onto the top of the gas turbine which is disposed on the first conveyance.

7. The mobile power generation system according to claim 1, wherein the height of the power generation transport apparatus is greater than a sum of a height of the first conveyance and a height of the gas turbine.

8. The mobile power generation system according to claim 1, wherein the retractable support mechanism comprises three expansion supports arranged in vertical direction.

9. The mobile power generation system according to claim 8, wherein the horizontal hydraulic cylinder is disposed between a second one of the three expansion supports and a third one of the three expansion supports.

10. The mobile power generation system according to claim 1, wherein the power generation transport apparatus further comprises an auxiliary system, the auxiliary system is applied to the gas turbine and the generator.

11. The mobile power generation system according to claim 1, wherein the intake assembly and the exhaust duct are arranged along a direction, and the at least four lifting gears are arranged at two sides of the intake-exhaust system opposite to each other in the direction.

\* \* \* \* \*